US012768857B2

(12) United States Patent
Wang et al.

(10) Patent No.: US 12,768,857 B2
(45) Date of Patent: Oct. 20, 2026

(54) METHOD AND DEVICE FOR TESTING POSITIONING AND SPEED MEASURING SYSTEM MAIN UNIT

(71) Applicant: CRRC QINGDAO SIFANG CO., LTD., Qingdao (CN)

(72) Inventors: Fengchao Wang, Qingdao (CN); Fujie Jiang, Qingdao (CN); Xin Miao, Qingdao (CN); Jiyu Han, Qingdao (CN); Dongyu Zhao, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 461 days.

(21) Appl. No.: 18/271,442

(22) PCT Filed: Jan. 5, 2022

(86) PCT No.: PCT/CN2022/070218
§ 371 (c)(1),
(2) Date: Jul. 7, 2023

(87) PCT Pub. No.: WO2022/148360
PCT Pub. Date: Jul. 14, 2022

(65) Prior Publication Data

US 2024/0061013 A1 Feb. 22, 2024

(30) Foreign Application Priority Data

Jan. 8, 2021 (CN) ......................... 202110023832.5

(51) Int. Cl.
*G01P 21/00* (2006.01)
*G01D 18/00* (2006.01)

(52) U.S. Cl.
CPC .............. *G01P 21/00* (2013.01); *G01D 18/00* (2013.01)

(58) Field of Classification Search
CPC ................................ G01P 21/00; G01D 18/00
See application file for complete search history.

(56) References Cited

U.S. PATENT DOCUMENTS 4,930,095 A 5/1990 Yuchi et al.
5,550,762 A 8/1996 Doll et al.
(Continued)

FOREIGN PATENT DOCUMENTS

CN 105301286 A 2/2016
CN 106681304 A 5/2017
(Continued)

OTHER PUBLICATIONS

CN 111818029 A (Year: 2020).*
(Continued)

*Primary Examiner* — Catherine T. Rastovski
*Assistant Examiner* — Sharad Timilsina
(74) *Attorney, Agent, or Firm* — Yue (Robert) Xu; Apex Attorneys at Law, LLP

(57) ABSTRACT

A method and device for testing a positioning and speed measuring system main unit. The method includes: obtaining a first simulation signal by simulating an absolute position sensor and a relative position sensor; sending the first simulation signal to a main unit of a to-be-tested positioning and speed measuring system; obtaining a first result calculated by the main unit based on the first simulation signal; obtaining a second result calculated based on the first simulation signal, the second result being a reference result corresponding to the first simulation signal; and determining that the main unit is abnormal if a comparison between the first result and the second result exceeds a first preset range. Therefore, the main unit can still be tested without components including absolute position sensors and relative position sensors, the test process is simple and easy (Continued)

to implement, a test environment can be built without large-scale investment.

8 Claims, 3 Drawing Sheets

(56) References Cited

U.S. PATENT DOCUMENTS

| | | | | |
|---|---|---|---|---|
| 10,623,624 | B2 * | 4/2020 | Fukai | H04N 13/296 |
| 2007/0200558 | A1 * | 8/2007 | Sellen | G01D 5/2033 324/176 |
| 2009/0039810 | A1 * | 2/2009 | Gotz | H02P 21/0085 318/400.32 |
| 2012/0297177 | A1 * | 11/2012 | Ghosh | G06F 21/575 713/2 |
| 2018/0129761 | A1 | 5/2018 | Lee et al. | |
| 2019/0179979 | A1 | 6/2019 | Melick | |
| 2020/0018617 | A1 | 1/2020 | Cardalda-Garcia et al. | |

FOREIGN PATENT DOCUMENTS

| | | | | | |
|---|---|---|---|---|---|
| CN | 108227519 | A | | 6/2018 | |
| CN | 109358599 | A | | 2/2019 | |
| CN | 109677450 | A | | 4/2019 | |
| CN | 109883448 | A | * | 6/2019 | |
| CN | 110688732 | A | | 1/2020 | |
| CN | 110781069 | A | | 2/2020 | |
| CN | 110907662 | A | * | 3/2020 | G01P 21/02 |
| CN | 111162855 | A | | 5/2020 | |
| CN | 210665797 | U | | 6/2020 | |
| CN | 111638072 | A | | 9/2020 | |
| CN | 111818029 | A | * | 10/2020 | H04L 61/4511 |
| CN | 112099478 | A | | 12/2020 | |
| CN | 112710871 | A | | 4/2021 | |
| JP | 2003044124 | A | | 12/2020 | |
| WO | 2016013711 | A1 | | 1/2016 | |

OTHER PUBLICATIONS

CN 109883448 (Year: 2019).*
International Search Report for PCT/CN2022/070218 mailed Mar. 15, 2022, ISA/CN.
European Search Report issued on Nov. 25, 2024 for the European counterpart application No. 22736522.8.

* cited by examiner

METHOD AND DEVICE FOR TESTING POSITIONING AND SPEED MEASURING SYSTEM MAIN UNIT

This application is the national phase of International Application No. PCT/CN2022/070218, titled "METHOD AND DEVICE FOR TESTING POSITIONING AND SPEED MEASURING SYSTEM MAIN UNIT", filed on Jan. 5, 2022, which claims the priority to Chinese Patent Application No. 202110023832.5, titled "METHOD AND DEVICE FOR TESTING POSITIONING AND SPEED MEASURING SYSTEM MAIN UNIT", filed on Jan. 8, 2021 with the China National Intellectual Property Administration, both of which are incorporated herein by reference in their entireties.

FIELD

The present disclosure relates to the field of test, and in particular, to a method and device for testing a main unit of a positioning and speed measuring system.

BACKGROUND

Currently, in the production and development process of a main unit of a positioning and speed measuring system of a high-speed maglev train, it is necessary to test the main unit of the positioning and speed measuring system to verify the function and performance of the main unit.

In conventional technology, there are mainly two ways to test the main unit of the positioning and speed measuring system. In one way, an absolute position sensor and a relative position sensor are placed on a trolley used for testing in a laboratory, and a long stator is arranged around the trolley according to the actual operating environment of the maglev train. When the trolley is moving, the absolute position sensor and the relative position sensor on the trolley obtain relevant signals and output the relevant signals to the main unit of the positioning and speed measuring system. The main unit processes the relevant signals sent by the absolute position sensor and the relative position sensor and then sends the processed signals to an operation control system, a wireless system, a control and diagnosis system, and the processed signals generated by the main unit is observed from other system ends. In another way, an excitation environment when the relative position sensor passes through the long stator is simulated by using a cogging simulation coil, and an excitation environment when the absolute position sensor passes through a flag board at high-speed is simulated by using a flag board simulation coil. The relative position sensor and the absolute position sensor operate by means of the excitation environment generated by the simulation coils to generate signals, and send the signals to the main unit of the positioning and speed measuring system to verify the function of the main unit.

In the above two ways, large-scale investment for building a test environment is required, for example, the absolute position sensor, the relative position sensor and the positioning flag board are required. The test process is complex, and the investment cost for the test environment is relatively high.

In view of this, the inventors design a method and device for testing a main unit of a positioning and speed measuring system according to the present disclosure.

SUMMARY

A method and device for testing a main unit of a positioning and speed measuring system are provided according to the present disclosure, to solve the problem of the complex test process and the large investment cost for the test environment during the test of the main unit of the positioning and speed measuring system for the high-speed maglev train.

To achieve the above objectives, the following technical solutions are provided according to the present disclosure.

A method for testing a main unit of a positioning and speed measuring system is provided, including:

obtaining a first simulation signal, the first simulation signal being obtained by simulating an absolute position sensor and a relative position sensor;

sending the first simulation signal to a main unit of a to-be-tested positioning and speed measuring system;

obtaining a first result calculated by the main unit of the to-be-tested positioning and speed measuring system based on the first simulation signal;

obtaining a second result calculated based on the first simulation signal, the second result being a reference result corresponding to the first simulation signal; and determining, if a comparison between the first result and the second result exceeds a first preset range, that the main unit of the to-be-tested positioning and speed measuring system is abnormal.

Preferably, the obtaining a second result calculated based on the first simulation signal includes:

calculating the second result based on the first simulation signal; or receiving the second result calculated by a reference positioning and speed measuring system with a normal positioning and speed measuring function based on the first simulation signal.

Preferably, the comparison between the first result and the second result exceeding the first preset range includes at least one of:

a difference between the first result and the second result is greater than or equal to a first threshold; and a ratio of the first result to the second result is greater than or equal to a second threshold.

Preferably, the first simulation signal is obtained by simulating the following signals:

a QSPI signal of interaction between the relative position sensor and the main unit of said positioning and speed measuring system, a pulse square wave of cogging outputted by the relative position sensor, diagnostic information outputted by the absolute position sensor, and flag board information sent by the absolute position sensor.

Preferably, the method further includes:

obtaining a second simulation signal, the second simulation signal being obtained by simulating another system, the another system including at least one of an on-board operation control system, an on-board wireless system, and an on-board control and diagnosis system;

sending the second simulation signal to the main unit of the to-be-tested positioning and speed measuring system;

obtaining a third result calculated by the main unit of the to-be-tested positioning and speed measuring system based on the second simulation signal;

obtaining a fourth result calculated based on the second simulation signal, the fourth result being a reference result corresponding to the second simulation signal; and determining, if a comparison between the third result and the fourth result exceeds a second preset range, that the main unit of the to-be-tested positioning and speed measuring system is abnormal.

A device for testing a main unit of a positioning and speed measuring system is further provided according to the present disclosure. The device includes:

a first simulation signal obtaining unit, configured to obtain a first simulation signal, the first simulation signal being obtained by simulating an absolute position sensor and a relative position sensor;

a first simulation signal sending unit, configured to send the first simulation signal to a main unit of a to-be-tested positioning and speed measuring system;

a first result calculating unit, configured to obtain a first result calculated by the main unit of the to-be-tested positioning and speed measuring system based on the first simulation signal;

a second result calculating unit, configured to obtain a second result calculated based on the first simulation signal, the second result being a reference result corresponding to the first simulation signal; and a first determining unit, configured to determine that the main unit of the to-be-tested positioning and speed measuring system is abnormal if a comparison between the first result and the second result exceeds a first preset range.

Preferably, the second result calculating unit includes:

a second result calculating subunit, configured to calculate the second result based on the first simulation signal; and a second result obtaining unit, configured to receive the second result calculated by a reference positioning and speed measuring system with a normal positioning and speed measuring function based on the first simulation signal.

Preferably, the comparison between the first result and the second result exceeding the first preset range includes at least one of:

a difference between the first result and the second result is greater than or equal to a first threshold; and a ratio of the first result to the second result is greater than or equal to a second threshold.

Preferably, the first simulation signal is obtained by simulating the following signals:

a QSPI signal of interaction between the relative position sensor and the main unit of said positioning and speed measuring system, a pulse square wave of cogging outputted by the relative position sensor, diagnostic information outputted by the absolute position sensor, and flag board information sent by the absolute position sensor.

Preferably, the device further includes a second simulation signal obtaining unit, configured to obtain a second simulation signal, the second simulation signal being obtained by simulating another system, the another system comprising at least one of an on-board operation control system, an on-board wireless system, and an on-board control and diagnosis system;

a second simulation signal sending unit, configured to send the second simulation signal to the main unit of the to-be-tested positioning and speed measuring system;

a third result calculating unit, configured to obtain a third result calculated by the main unit of the to-be-tested positioning and speed measuring system based on the second simulation signal;

a fourth result calculating unit, configured to obtain a fourth result calculated based on the second simulation signal, the fourth result being a reference result corresponding to the second simulation signal; and a second determining unit, configured to determine that the main unit of the to-be-tested positioning and speed measuring system is abnormal if a comparison between the third result and the fourth result exceeds a second preset range.

It can be seen from the above technical solutions that in the method for testing a main unit of a positioning and speed measuring system according to the present disclosure, a first simulation signal is obtained, where the first simulation signal is obtained by simulating an absolute position sensor and a relative position sensor, the first simulation signal is sent to the main unit of the to-be-tested positioning and speed measuring system, a first result calculated by the main unit of the to-be-tested positioning and speed measuring system based on the first simulation signal is obtained, a second result calculated based on the first simulation signal is obtained, where the second result is a reference result corresponding to the first simulation signal, and it is determined that the main unit of the to-be-tested positioning and speed measuring system is abnormal if a comparison between the first result and the second result exceeds a first preset range. It can be seen that in the embodiment of the present disclosure, the main unit of the positioning and speed measuring system may be tested without the absolute position sensor and the relative position sensor, and the test process is simple and easy and does not require the large-scale investment for building a test environment, which saves costs.

BRIEF DESCRIPTION OF THE DRAWINGS

In order to illustrate technical solutions in embodiments of the present disclosure or the conventional technology more clearly, drawings to be used in the description of the embodiments or the conventional technology are introduced simply hereinafter. It is apparent that the drawings described below show only some embodiments of the present disclosure. For those skilled in the art, other drawings may be obtained based on the provided drawings without any creative work.

DETAILED DESCRIPTION OF EMBODIMENTS

Figure 1:
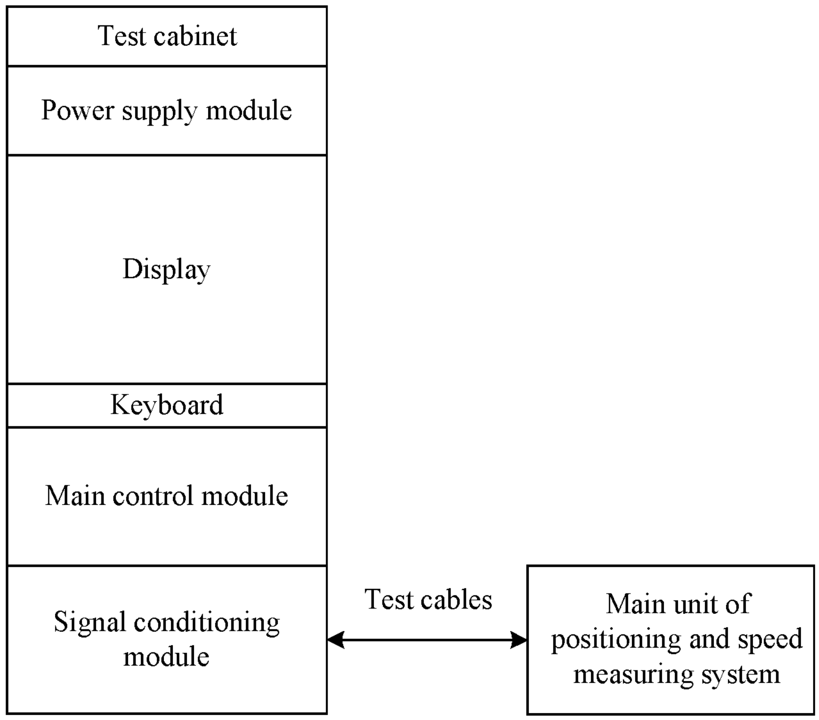
FIG. 1 is a structural diagram showing a test cabinet of a device for testing a main unit of a positioning and speed measuring system according to an embodiment of the present disclosure.

In order to enable those skilled in the art to better understand the solutions according to the present disclosure, the technical solutions of embodiments in the present disclosure are described clearly and completely hereinafter with reference to the drawings for the embodiments of the present disclosure. It is apparent that the embodiments described are only some rather than all the embodiments of the present disclosure. Based on the embodiments of the present disclosure, all other embodiments obtained by those skilled in the art without any creative work should fall within the protection scope of the present disclosure.

Currently, in the production and development process of a main unit of a positioning and speed measuring system of a high-speed maglev train, it is necessary to test the main unit of the positioning and speed measuring system to verify the function and performance of the main unit. In conventional technology, there are mainly two ways to test the main unit of the positioning and speed measuring system.

In one way, an absolute position sensor and a relative position sensor are placed on a trolley used for testing in a laboratory, and a long stator is arranged around the trolley according to the actual operating environment of the maglev train. When the trolley is moving, the absolute position sensor and the relative position sensor on the trolley obtain relevant signals and output the relevant signals to the main unit of the positioning and speed measuring system. The main unit processes the relevant signals sent by the absolute position sensor and the relative position sensor and then sends the processed signals to an operation control system, a wireless system, a control and diagnosis system, and the processed signals generated by the main unit is observed from other system ends. In such way, during the test of the main unit of the positioning and speed measuring system, a test platform is required to be built according to the actual operating environment of the maglev train, and the absolute position sensor, the relative position sensor and the positioning flag board are required to be arranged. The investment cost for the test environment is large, only operating states in a low-speed operating environment may be tested, and operating states in a full-speed range of 600 km/h cannot be tested.

In another way, an excitation environment when the relative position sensor passes through the long stator is simulated by using a cogging simulation coil, and an excitation environment when the absolute position sensor passes through a flag board at high-speed is simulated by using a flag board simulation coil. The relative position sensor and the absolute position sensor operate by means of the excitation environment generated by the simulation coils to generate signals, and send the signals to the main unit of the positioning and speed measuring system to verify the function of the main unit. In such way, although the operating environment in the full-speed range may be achieved without building a motion platform, both the absolute position sensor, the relative position sensor and the positioning flag board are required to be arranged. In addition, a tooling and a controller for the cogging simulation coil, and a tooling and a controller for the flag board simulation coil are further required. The tooling often has errors, affecting the determination of the function of the main unit of the positioning and speed measuring system during the test.

In order to solve the above technical problems, a method and a device for testing a main unit of a positioning and speed measuring system are provided according to embodiments of the present disclosure, so that the positioning and speed measuring system is tested without the absolute position sensor and the relative position sensor, the test process is simple and easy and does not require the large-scale investment for building a test environment, which saves the costs.

Some non-limiting embodiments of the present disclosure are described in detail below in conjunction with the drawings.

For the convenience of explanation, a hardware scenario of the embodiments of the present disclosure is described hereinafter.

In an embodiment of the present disclosure, a positioning and speed measuring system for the high-speed maglev train may include a main unit of the positioning and speed measuring system (ORTPR), a relative position sensor (NUT), an absolute position sensor (INK) and a positioning flag board (LRL) arranged on a rail. The number of the absolute position sensor may be two, and the number of the relative position sensor may be two.

A long stator is arranged around the train. The long stator may be in a cogged structure. When the train is traveling, the relative position sensor arranged on the train may output two signals that change periodically with a change of a position of cogging where the train is located by detecting an upper surface of the long stator in the cogged structure. The absolute position sensor arranged on the train may obtain encoding information of the positioning flag board by scanning the passive positioning flag board arranged on the rail, so as to obtain absolute position information of the train. The main unit of the positioning and speed measuring system may obtain information sent from the relative position sensor and the absolute position sensor, process the information to generate processed information, and then send the processed information to an on-board wireless system, an on-board operation control system, an on-board control and diagnosis system, so as to achieve the monitoring and control of the train.

The main unit of the positioning and speed measuring system is formed by an electronic positioning unit (ORT) and a unit for processing a magnetic pole and a phase angle (PRW), and is configured to process corresponding signals.

In an embodiment of the present disclosure, during the test of the main unit of the positioning and speed measuring system, instead of arranging the long stator, the positioning flag board, the absolute position sensor, and the relative position sensor, a signal is obtained by simulating the relative position sensor passing through a cogging of the long stator to generate the signal to be sent to the main unit of the positioning and speed measuring system, and another signal is obtained by simulating the absolute position sensor passing through the flag board to generate the signal to be sent to the main unit of the positioning and speed measuring system, so that the main unit of the positioning and speed measuring system may generate a processed result based on the received signals, and it may be determined whether the main unit of the positioning and speed measuring system is abnormal based on the processed result. In addition, in a case that the processed result indicates that there is an error, it may be determined that the main unit of the positioning and speed measuring system is abnormal. That is, in the embodiment of the present disclosure, the positioning and speed measuring system may be tested in when there is only a tested object without the absolute position sensor and the relative position sensor, thus, the test process is simple and easy and does not require the large-scale investment for building a test environment, which saves costs.

The main unit of the positioning and speed measuring system may be tested by a test cabinet. As shown in FIG. 1, the test cabinet may include a main control module and test cables. The test cables are configured to connect the test cabinet to the main unit of the positioning and speed measuring system, so that the test cabinet communicates with the main unit of the positioning and speed measuring system. The test cables are led out from the test cabinet, and another end of the test cables are connected to an aviation plug, and the aviation plug matches a connector of the tested object (that is, the main unit of the positioning and speed measuring system). The number of the test cables is ten, and may be labeled as X101 to X110. The main control module is a core component for calculating and processing of the test cabinet, and may be configured to test the main unit of the positioning and speed measuring system. Specifically, the main control module may generate a simulation signal and verify the processed result from the main unit of the positioning and speed measuring system to determine whether the function of the main unit of the positioning and speed measuring system is normal.

The main control module may include a CPU processor, and may further include a case, an RS485 interface card for synchronizing with sending and receiving of an RS485 signal, an RS232 serial port card for sending and receiving RS232 communication data, a QSPI (Queued Serial Peripheral Interface) interface card for processing a QSPI signal, a CAN interface card for CAN communication, a DI/DO module for inputting and outputting a digital signal, and an AI/AO module for inputting and outputting an analog signal.

The test cabinet may further include a power supply module, a signal conditioning module, a display, a keyboard, and the like. The power supply module controls input power (220V) for the test cabinet, and supplies power to each module in the test cabinet. The signal conditioning module is configured to modify a signal generated by the main control module into a signal that may be adapted to be received by the main unit of the positioning and speed measuring system, modify a signal fed back by the main unit of the positioning and speed measuring system into a signal that may be adapted to be received by the main control module, and process a signal of a physical layer, including an RS485 differential signal, a TTY current-loop signal, and the like. The display is configured to display a test process and a test result. The keyboard is configured to input test instructions by a tester.

Exemplary Method

Figure 2:
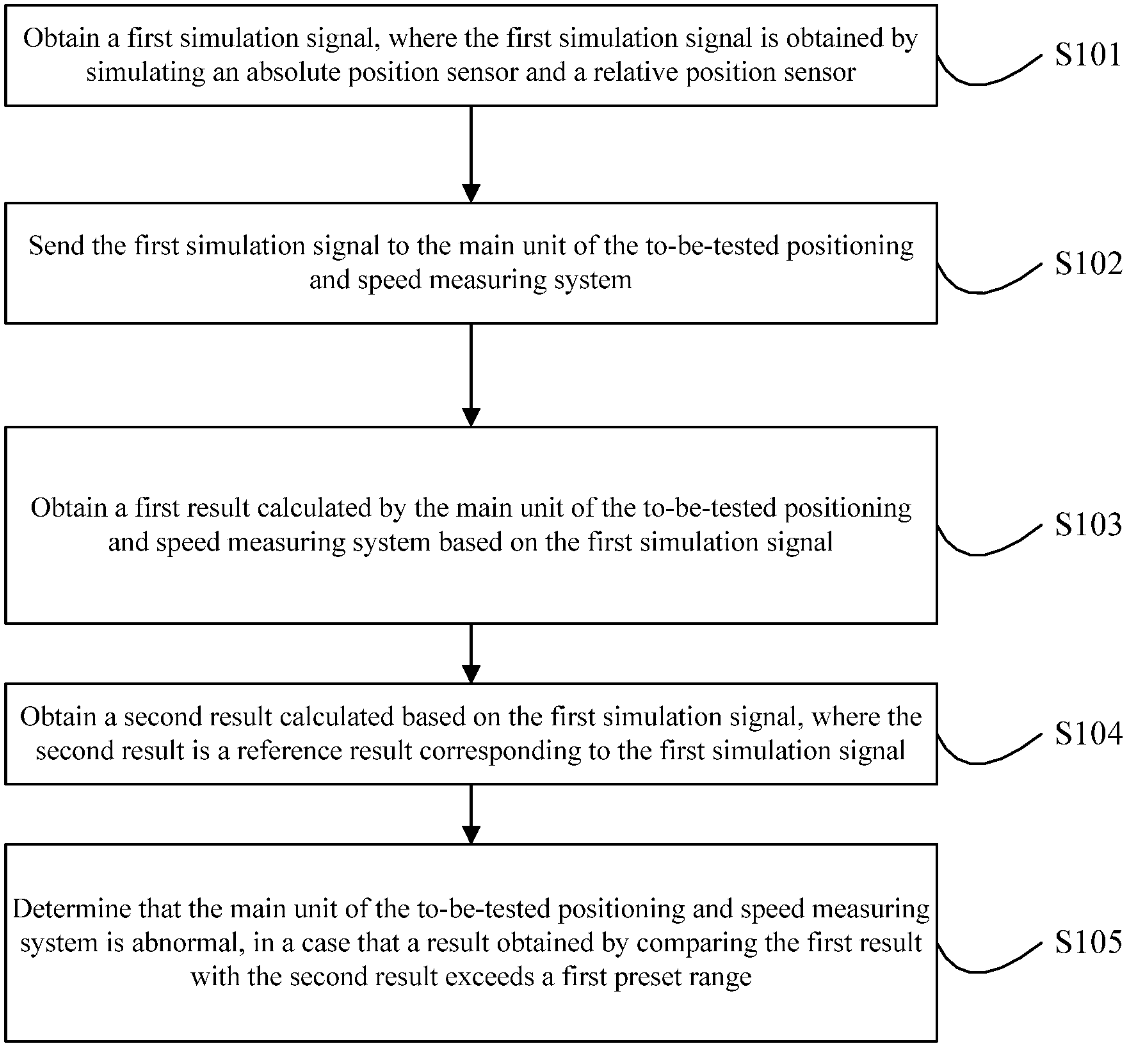
FIG. 2 is a flow chart showing a method for testing a main unit of a positioning and speed measuring system according to an embodiment of the present disclosure.

Reference is made to FIG. 2, which is a flow chart showing a method for testing a main unit of a positioning and speed measuring system according to an embodiment of the present disclosure. The method may include the following steps S101 to S105.

In step S101, a first simulation signal is obtained, and the first simulation signal is obtained by simulating an absolute position sensor and a relative position sensor.

In the embodiment of the present disclosure, the absolute position sensor and the relative position sensor may be simulated in different operating conditions to obtain first simulation signals corresponding to the different operating conditions. The operating conditions may include a speed of the train, a traveling direction of the train, whether a sensor is normal, and the like. For example, the first simulation signal may be obtained in an operating condition that the speed of the train is 300 km/h and the traveling direction of the train is east.

The first simulation signal may specifically be obtained by simulating the following signals: a QSPI signal of interaction between the relative position sensor and the main unit of the positioning and speed measuring system, a pulse square wave of the cogging outputted by the relative position sensor, diagnostic information outputted by the absolute position sensor, and information of the flag board sent by the absolute position sensor.

In the embodiment of the present disclosure, the test cabinet may simulate the absolute position sensor and the relative position sensor to obtain the first simulation signal, so that the positioning and speed measuring system may be tested without building a test environment with the absolute position sensor and the relative position sensor, reducing the test cost. In addition, compared with a signal actually measured by the absolute position sensor and the relative position sensor, a signal obtained through simulation by the test cabinet has a smaller error, the simulation signal may correspond to any one of operating conditions in the full-speed range of 600 km/h, and the test is more comprehensive.

It should be noted that a specific operating condition in the embodiment of the present disclosure may be determined by those skilled in the art according to the actual situation, which is not limited herein.

The first simulation signal may correspond to output signals of two absolute position sensors and output signals of two relative position sensors. The first simulation signal may be determined by setting simulation parameters of the test cabinet. The settings of the simulation parameters may include settings of the absolute position sensor, settings of the relative position sensor and settings of the system. The settings of the absolute position sensor may include: setting information of the flag board (that is set according to the test requirements, information of multiple flag boards may be set), a space interval of the flag boards, start simulation of an absolute position sensor 1, start simulation of an absolute position sensor 2, and simultaneously start simulation of the absolute position sensor 1 and the absolute position sensor 2. The settings of the relative position sensor may include: sine-cosine amplitude, a diagnostic bit of the relative position sensor, start simulation of a relative position sensor 1, start simulation of a relative position sensor 2, and simultaneously start simulation of the absolute position sensor 1 and the absolute position sensor 2. The settings of the system may include: the speed of a train, the traveling direction of the train, ORT position encoding and PRW position encoding.

The first simulation signal may be generated after the test cables of the test cabinet are connected to the tested object (that is, the main unit of the positioning and speed measuring system). For example, the first simulation signal is generated after the test cables X101 to X110 are correctly connected to an interface of the tested object (that is, the main unit of the positioning and speed measuring system) according to serial numbers of the cables, the test cabinet is powered on, starts to operate, and the simulation parameters are set.

In step S102, the first simulation signal is sent to the main unit of the to-be-tested positioning and speed measuring system.

After the first simulation signal is generated, the first simulation signal may be sent to the main unit of the to-be-tested positioning and speed measuring system. The first simulation signal may be obtained by simulating the following signals: the QSPI signal of interaction between the relative position sensor and the main unit of the positioning and speed measuring system, the pulse square wave of the cogging outputted by the relative position sensor, the diagnostic information outputted by the absolute position sensor, and the information of the flag board sent by the absolute position sensor.

The first simulation signal sent to the main unit of the to-be-tested positioning and speed measuring system may be data corresponding to one operating condition or data corresponding to multiple operating conditions.

In step S103, a first result calculated by the to-be-tested positioning and speed measuring system based on the first simulation signal is obtained.

In the embodiment of the present disclosure, on receipt of the first simulation signal, the to-be-tested positioning and speed measuring system may process the first simulation signal, to generate a calculated processed result (that is, the first result), and then send the first result to the test cabinet through the test cables.

That is, the test cabinet may not only generate the first simulation signal and send the first simulation signal to the to-be-tested positioning and speed measuring system, but also obtain the first result calculated by the main unit of the to-be-tested positioning and speed measuring system based on the first simulation signal, so as to test the to-be-tested positioning and speed measuring system based on the first result.

In a case that the first simulation signal sent to the positioning and speed measuring system is data corresponding to one operating condition, the obtained first result corresponds to the operating condition. In a case that the first simulation signal is data corresponding to multiple operating conditions, the obtained first result includes multiple processed results obtained by respectively processing the data corresponding to the multiple operating conditions.

In step S104, a second result calculated based on the first simulation signal is obtained, and the second result is a reference result corresponding to the first simulation signal.

In the embodiment of the present disclosure, in order to determine whether a positioning and speed measuring function of the positioning and speed measuring system is normal, it is required to compare the first result calculated by the to-be-tested positioning and speed measuring system based on the first simulation signal with the reference result. Therefore, the test cabinet is further required to obtain the second result calculated based on the first simulation signal. The second result is the reference result corresponding to the first simulation signal, then the main unit of the to-be-tested positioning and speed measuring system is tested by comparing the first result with the second result.

In the embodiment of the present disclosure, the second result may be obtained by the following two ways. The test cabinet may directly calculate the second result based on the first simulation signal, or may receive the second result calculated by a reference positioning and speed measuring system with a normal positioning and speed measuring function based on the first simulation signal.

In a case that the test cabinet directly calculates the second result based on the first simulation signal, the reference positioning and speed measuring system is not required, saving hardware resources, and reducing the investment cost for testing. In a case that the test cabinet receives the second result calculated by the reference positioning and speed measuring system with the normal positioning and speed measuring function based on the first simulation signal, requirements on hardware resources of the test cabinet can be reduced.

It should be noted that the step S104 may be performed before the step S102, performed before the step S103, or performed after the step S103, which may be determined by those skilled in the art according to actual requirements.

In step S105, in a case that a result obtained by comparing the first result with the second result exceeds a first preset range, it is determined that the main unit of the to-be-tested positioning and speed measuring system is abnormal.

In the embodiment of the present disclosure, in a case that the first result and the second result have a small difference, it may be determined that the positioning and speed measuring system has a normal positioning and speed measuring function. Therefore, in a case that the result obtained by comparing the first result with the second result exceeds the first preset range, it may be determined that the to-be-tested positioning and speed measuring system is abnormal. In a case that the to-be-tested positioning and speed measuring system is abnormal, a test report may be generated for users to view.

The result obtained by comparing the first result with the second result exceeding the first preset range may include at least one of: a difference between the first result and the second result is greater than a first threshold, and a ratio of the first result to the second result is greater than a second threshold. It should be noted that the first threshold and the second threshold may be determined by those skilled in the art according to actual requirements, which are not limited in the present disclosure.

In addition, in the embodiment of the present disclosure, the test cabinet may further perform at least one of ORT test, PRW test and CAN diagnostic test on the to-be-tested positioning and speed measuring system.

The ORT test refers to that the test cabinet simulates information interaction between the on-board operation control system and the main unit of the positioning and speed measuring system, and performs different ORTs on the main unit of the positioning and speed measuring system by selecting different operating modes. The operating modes mainly include: a positioning and speed measuring mode, an entry detection mode, a ROM detection mode, and a RAM detection mode. The PRW test refers to that the test cabinet simulates interaction between the on-board wireless system and the main unit of the positioning and speed measuring system, performs PRW test on the main unit of the positioning and speed measuring system, and communication timing may be flexibly set during the test. The CAN test refers to that the test cabinet simulates interaction between the on-board control and diagnosis system and the main unit of the positioning and speed measuring system, performs CAN diagnosis on the main unit of the positioning and speed measuring system, the content, the number of communication times and a time interval of CAN messages may be flexibly set during the test.

In other words, the test cabinet may further simulate the information interaction between the on-board operation control system and the main unit of the positioning and speed measuring system, simulate the information interaction between the on-board wireless system and the main unit of the positioning and speed measuring system, and simulate the information interaction between the on-board control and diagnosis system and the main unit of the positioning and speed measuring system, so as to test the performance of the main unit of the positioning and speed measuring system. The processes of the ORT test, the PRW test and the CAN diagnostic test may be displayed on a display interface, and thus have high visualization, improving user experience.

A second simulation signal may be obtained. The second simulation signal may be obtained by simulating another system, and the another system includes at least one of: the on-board operation control system, the on-board wireless system, and the on-board control and diagnosis system. The second simulation signal obtained by simulating the on-board operation control system or the on-board control and diagnosis system is the TTY current-loop signal, and the second simulation signal obtained by simulating the on-board wireless system is an RS485 serial-port signal. In the embodiment of the present disclosure, the CAN interface card may be used for CAN communication when the test cabinet simulates the interaction between the on-board control and diagnosis system and the to-be-tested positioning and speed measuring system.

The second simulation signal may be sent to the to-be-tested positioning and speed measuring system, a third result calculated by the to-be-tested positioning and speed measuring system based on the second simulation signal is obtained, a fourth result calculated based on the second simulation signal is obtained, where the fourth result is a reference result corresponding to the second simulation signal, and it is determined that the to-be-tested positioning and speed measuring system is abnormal, in a case that a result obtained by comparing the third result with the fourth result exceeds a second preset range.

The third result may be obtained by the test cabinet based on the second simulation signal, or obtained by the main unit of the reference positioning and speed measuring system. The second preset range may be determined according to the actual situation.

After the to-be-tested positioning and speed measuring system is tested, the test cabinet may be powered off.

In the method according to the embodiment of the present disclosure, a first simulation signal is obtained, where the first simulation signal is obtained d by simulating an absolute position sensor and a relative position sensor, the first simulation signal is sent to the main unit of the to-be-tested positioning and speed measuring system, a first result calculated by the main unit of the to-be-tested positioning and speed measuring system based on the first simulation signal is obtained, a second result calculated based on the first simulation signal is obtained, where the second result is a reference result corresponding to the first simulation signal, and it is determined that the main unit of the to-be-tested positioning and speed measuring system is abnormal, in a case that a result obtained by comparing the first result with the second result exceeds the first preset range. It can be seen that in the embodiment of the present disclosure, the main unit of the positioning and speed measuring system may be tested without the absolute position sensor and the relative position sensor, and the test process is simple and easy and does not require the large-scale investment for building a test environment, which saves costs.

Exemplary Device

Figure 3:
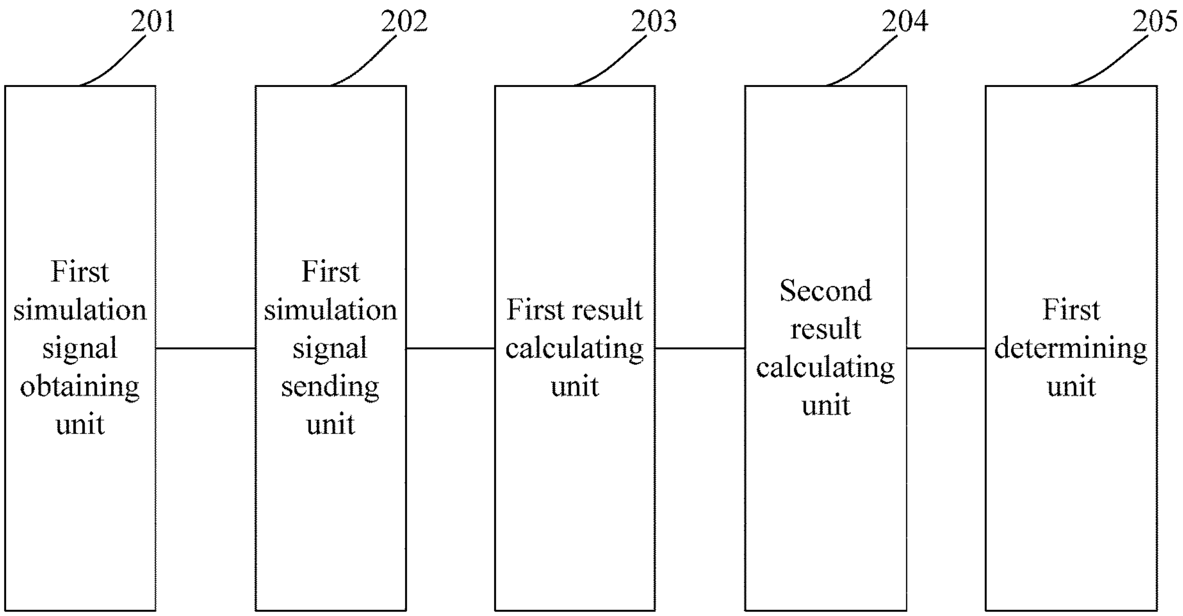
FIG. 3 is a schematic diagram showing a device for testing a main unit of a positioning and speed measuring system according to an embodiment of the present disclosure.

Reference is made to FIG. 3, which is a schematic diagram showing a device for testing a main unit of a positioning and speed measuring system according to an embodiment of the present disclosure. The device includes:

- a first simulation signal obtaining unit 201, configured to obtain a first simulation signal, where the first simulation signal is obtained by simulating an absolute position sensor and a relative position sensor;
- a first simulation signal sending unit 202, configured to send the first simulation signal to the main unit of the to-be-tested positioning and speed measuring system;
- a first result calculating unit 203, configured to obtain a first result calculated by the main unit of the to-be-tested positioning and speed measuring system based on the first simulation signal;
- a second result calculating unit 204, configured to obtain a second result calculated based on the first simulation signal, where the second result is a reference result corresponding to the first simulation signal; and
- a first determining unit 205, configured to determine that the main unit of the to-be-tested positioning and speed measuring system is abnormal, in a case that a result obtained by comparing the first result with the second result exceeds a first preset range.

In an embodiment, the second result calculating unit 204 includes:

- a second result calculating subunit, configured to calculate the second result based on the first simulation signal; and
- a second result obtaining unit, configured to receive the second result calculated by a reference positioning and speed measuring system with a normal positioning and speed measuring function based on the first simulation signal.

In an embodiment, the result obtained by comparing the first result with the second result exceeding the preset range includes at least one of:

- a difference between the first result and the second result is greater than or equal to a first threshold; and
- a ratio of the first result to the second result is greater than or equal to a second threshold.

In an embodiment, the first simulation signal is obtained by simulating the following signals:

- a QSPI signal of interaction between the relative position sensor and the main unit of the positioning and speed measuring system, a pulse square wave of cogging outputted by the relative position sensor, diagnostic information outputted by the absolute position sensor, and flag board information sent by the absolute position sensor.

In an embodiment, the device further includes:

- a second simulation signal obtaining unit, configured to obtain a second simulation signal, where the second simulation signal is obtained by simulating another system, and the another system includes at least one of: an on-board operation control system, an on-board wireless system, and an on-board control and diagnosis system;
- a second simulation signal sending unit, configured to send the second simulation signal to the main unit of the to-be-tested positioning and speed measuring system;
- a third result calculating unit, configured to obtain a third result calculated by the main unit of the to-be-tested positioning and speed measuring system based on the second simulation signal;
- a fourth result calculating unit, configured to obtain a fourth result calculated based on the second simulation signal, where the fourth result is a reference result corresponding to the second simulation signal; and
- a second determining unit, configured to determine that the main unit of the to-be-tested positioning and speed measuring system is abnormal, in a case that a result obtained by comparing the third result with the fourth result exceeds a second preset range.

For implementations of each unit or module in the device according to the present disclosure, reference may be made to the method shown in FIG. 1, and the implementations are not repeated herein.

With the device according to the embodiment of the present disclosure, a first simulation signal is obtained, where the first simulation signal is obtained by simulating an absolute position sensor and a relative position sensor, the first simulation signal is sent to the main unit of the to-be-tested positioning and speed measuring system, a first result calculated by the main unit of the to-be-tested positioning and speed measuring system based on the first simulation signal is obtained, a second result calculated based on the first simulation signal is obtained, where the second result is a reference result corresponding to the first simulation signal, and it is determined that the main unit of the to-be-tested positioning and speed measuring system is abnormal, in a case that a result obtained by comparing the first result with the second result exceeds the first preset range. It can be seen that in the embodiment of the present disclosure, the main unit of the positioning and speed measuring system may be tested without the absolute position sensor and the relative position sensor, and the test process is simple and easy and does not require the large-scale investment for building a test environment, which saves costs.

It should be noted that the embodiments in this specification are described in a progressive manner, each of the embodiments emphasizes the differences between the embodiment and other embodiments, and the same or similar parts among the embodiments may be referred to each other. Particularly, since embodiments of the device and system are substantially similar to the embodiments of the method, the embodiments of the device and system are described briefly. For relevant parts, reference may be made to the description of the method. The above embodiments of the device and system are merely illustrative. The units described as separate components may or may not be physically separated, and the component displayed as a unit may or may not be a physical unit, that is, may be located in one place, or may be distributed on multiple network units. Some or all of the modules may be selected based on actual requirements to achieve the objectives of the solutions of the embodiments. Those skilled in the art may understand and implement the present disclosure without any creative effort.

The above embodiments are only some specific embodiments of the present disclosure, and a protection scope of the present disclosure is not limited thereto. Any changes or replacements that may be easily conceived by those skilled in the art within the technical scope disclosed in the present disclosure should fall within the protection scope of the present disclosure. Therefore, the protection scope of the present disclosure is defined by the claims.

The invention claimed is:

1. A method for testing a main unit of a positioning and speed measuring system, comprising:

generating a first simulation signal by a test cabinet having a processor, the first simulation signal being obtained by simulating an absolute position sensor and a relative position sensor, wherein the first simulation signal comprises a signal to be sent to a main unit of a to-be-tested positioning and speed measuring system which is generated by simulating the relative position sensor passing through a cogging of a long stator, wherein the long stator is a stator arranged along a rail, and another signal to be sent to the main unit of the to-be-tested positioning and speed measuring system which is generated by simulating the absolute position sensor passing through a flag board;

sending the first simulation signal to the main unit of the to-be-tested positioning and speed measuring system by the test cabinet;

obtaining by the test cabinet a first result calculated by the main unit of the to-be-tested positioning and speed measuring system based on the first simulation signal;

obtaining a second result calculated by the test cabinet based on the first simulation signal, the second result being a reference result corresponding to the first simulation signal; and determining by the test cabinet, if a comparison between the first result and the second result exceeds a first preset range, that the main unit of the to-be-tested positioning and speed measuring system is abnormal.

2. The method according to claim 1, wherein the comparison between the first result and the second result exceeding the first preset range comprises at least one of:

a difference between the first result and the second result is greater than or equal to a first threshold; and a ratio of the first result to the second result is greater than or equal to a second threshold.

3. The method according to claim 1, wherein the first simulation signal is obtained by simulating the following signals:

a QSPI signal of interaction between the relative position sensor and the main unit of said positioning and speed measuring system, a pulse square wave of cogging outputted by the relative position sensor, diagnostic information outputted by the absolute position sensor, and flag board information sent by the absolute position sensor.

4. The method according to claim 1, further comprising:

obtaining a second simulation signal, the second simulation signal being obtained by simulating another system, the another system comprising at least one of an on-board operation control system, an on-board wireless system, and an on-board control and diagnosis system;

sending the second simulation signal to the main unit of the to-be-tested positioning and speed measuring system;

obtaining a third result by the test cabinet calculated by the main unit of the to-be-tested positioning and speed measuring system based on the second simulation signal;

obtaining a fourth result calculated based on the second simulation signal, the fourth result being a reference result corresponding to the second simulation signal; and determining, if a comparison between the third result and the fourth result exceeds a second preset range, that the main unit of the to-be-tested positioning and speed measuring system is abnormal.

5. A device for testing a main unit of a positioning and speed measuring system, comprising:

a first simulation signal obtaining unit, configured to obtain a first simulation signal generated by the test cabinet having a processor, the first simulation signal being obtained by simulating an absolute position sensor and a relative position sensor;

a first simulation signal sending unit, configured to send the first simulation signal to a main unit of a to-be-tested positioning and speed measuring system, wherein the first simulation signal comprises a signal to be sent to the main unit of a to-be-tested positioning and speed measuring system which is generated by simulating the relative position sensor passing through a cogging of a long stator, wherein the long stator is a stator arranged along a rail, and another signal to be sent to the main unit of the to-be-tested positioning and speed measuring system which is generated by simulating the absolute position sensor passing through a flag board;

a first result calculating unit, configured to obtain a first result calculated by the main unit of the to-be-tested positioning and speed measuring system based on the first simulation signal;

a second result calculating unit, configured to obtain a second result calculated by the test cabinet based on the first simulation signal, the second result being a reference result corresponding to the first simulation signal; and a first determining unit, configured to determine by the test cabinet that the main unit of the to-be-tested positioning and speed measuring system is abnormal if a comparison between the first result and the second result exceeds a first preset range.

6. The device according to claim 5, wherein the comparison between the first result and the second result exceeding the first preset range comprises at least one of:

a difference between the first result and the second result is greater than or equal to a first threshold; and a ratio of the first result to the second result is greater than or equal to a second threshold.

7. The device according to claim 5, wherein the first simulation signal is obtained by simulating the following signals:

a QSPI signal of interaction between the relative position sensor and the main unit of said positioning and speed measuring system, a pulse square wave of cogging outputted by the relative position sensor, diagnostic information outputted by the absolute position sensor, and flag board information sent by the absolute position sensor.

8. The device according to claim 5, further comprising:

a second simulation signal obtaining unit, configured to obtain a second simulation signal, the second simulation signal being obtained by simulating another system, the another system comprising at least one of an on-board operation control system, an on-board wireless system, and an on-board control and diagnosis system;

a second simulation signal sending unit, configured to send the second simulation signal to the main unit of the to-be-tested positioning and speed measuring system;

a third result calculating unit, configured to obtain a third result calculated by the main unit of the to-be-tested positioning and speed measuring system based on the second simulation signal;

a fourth result calculating unit, configured to obtain a fourth result calculated based on the second simulation signal, the fourth result being a reference result corresponding to the second simulation signal; and a second determining unit, configured to determine that the main unit of the to-be-tested positioning and speed measuring system is abnormal if a comparison between the third result and the fourth result exceeds a second preset range.

* * * * *